United States Patent
Dieppedalle et al.

[11] Patent Number: 5,608,598
[45] Date of Patent: Mar. 4, 1997

[54] EFFECTOR WITH SELF-COMPENSATED CONTACTS FOR POWER SUPPLY OF A RECEIVER CIRCUIT

[75] Inventors: François Dieppedalle, Poisat; Alain Frolla, Froges, both of France

[73] Assignee: Merlin Gerin, France

[21] Appl. No.: 226,307

[22] Filed: Apr. 12, 1994

[30] Foreign Application Priority Data

Apr. 23, 1993 [FR] France .................................. 93 04926

[51] Int. Cl.[6] .................................................. H02H 11/00
[52] U.S. Cl. ........................... 361/160; 307/143; 361/188; 361/7
[58] Field of Search ..................................... 361/160, 187, 361/188, 194, 2, 193, 5, 6, 7, 166; 307/134, 130, 139, 142, 143

[56] References Cited

U.S. PATENT DOCUMENTS 3,263,042  7/1966  Dyer et al. .

FOREIGN PATENT DOCUMENTS 3520904  12/1986  Germany .
797036   6/1958   United Kingdom .
2149215  6/1985   United Kingdom .

*Primary Examiner*—Fritz Fleming
*Attorney, Agent, or Firm*—Parkhurst, Wendel & Burr, L.L.P.

[57] ABSTRACT

The present invention relates to an effector comprising power contacts for power supply of a receiver. The effector comprises an operating mechanism for the power contacts, this mechanism being actuated by an electromagnet. Between a power circuit for supplying power to the receiver and the return power circuit, there is connected a measuring and processing unit arranged to measure the impedance at the terminals of the power supply circuit of the receiver. This unit is coupled to a contact of the control circuit. The contact is arranged to cut the power supply of the control circuit in the event of a short-circuit of the power supply circuit of the receiver.

8 Claims, 4 Drawing Sheets

EFFECTOR WITH SELF-COMPENSATED CONTACTS FOR POWER SUPPLY OF A RECEIVER CIRCUIT

BACKGROUND OF THE INVENTION

The present invention relates to an effector comprising an electromagnet associated with an operating mechanism of power contacts of an electrical circuit for power supply of at least one receiver.

Effectors whose power contacts are associated with a spring whose purpose is to maintain these contacts in the closed position whatever the state of the circuit of the corresponding receivers are known in the art.

These springs are relatively weak and in any case insufficient to compensate the repulsion forces by striction which are generated when a short-circuit occurs in the power supply circuit of the receivers. Due to these forces, the contacts bounce and may be welded. This happens either when a short-circuit occurs whereas the contacts are closed or when an operator wishes to close the contacts on a short-circuit of the receiver circuit.

SUMMARY OF THE INVENTION

The object of the invention is to eliminate this risk of welding of the power contacts.

This object is achieved by the apparatus according to the invention characterized in that the power contacts are equipped with a system for compensating the striction repulsion forces resulting from a short-circuit of the power supply circuit of the receiver, that it comprises means for measuring the impedance of said circuit in the open position of said power contacts, and that it is provided with means for preventing closing of these contacts in case of an abnormal value of this impedance.

This compensation system may for example be of the electrodynamic type or of the electromagnetic type.

BRIEF DESCRIPTION OF THE DRAWINGS

The present invention will become more clearly apparent from the following description of preferred illustrative embodiments, given as non-restrictive examples only and represented in the accompanying drawings in which.

DETAILED DESCRIPTION OF THE PREFERRED EMBODIMENT

Figure 1:
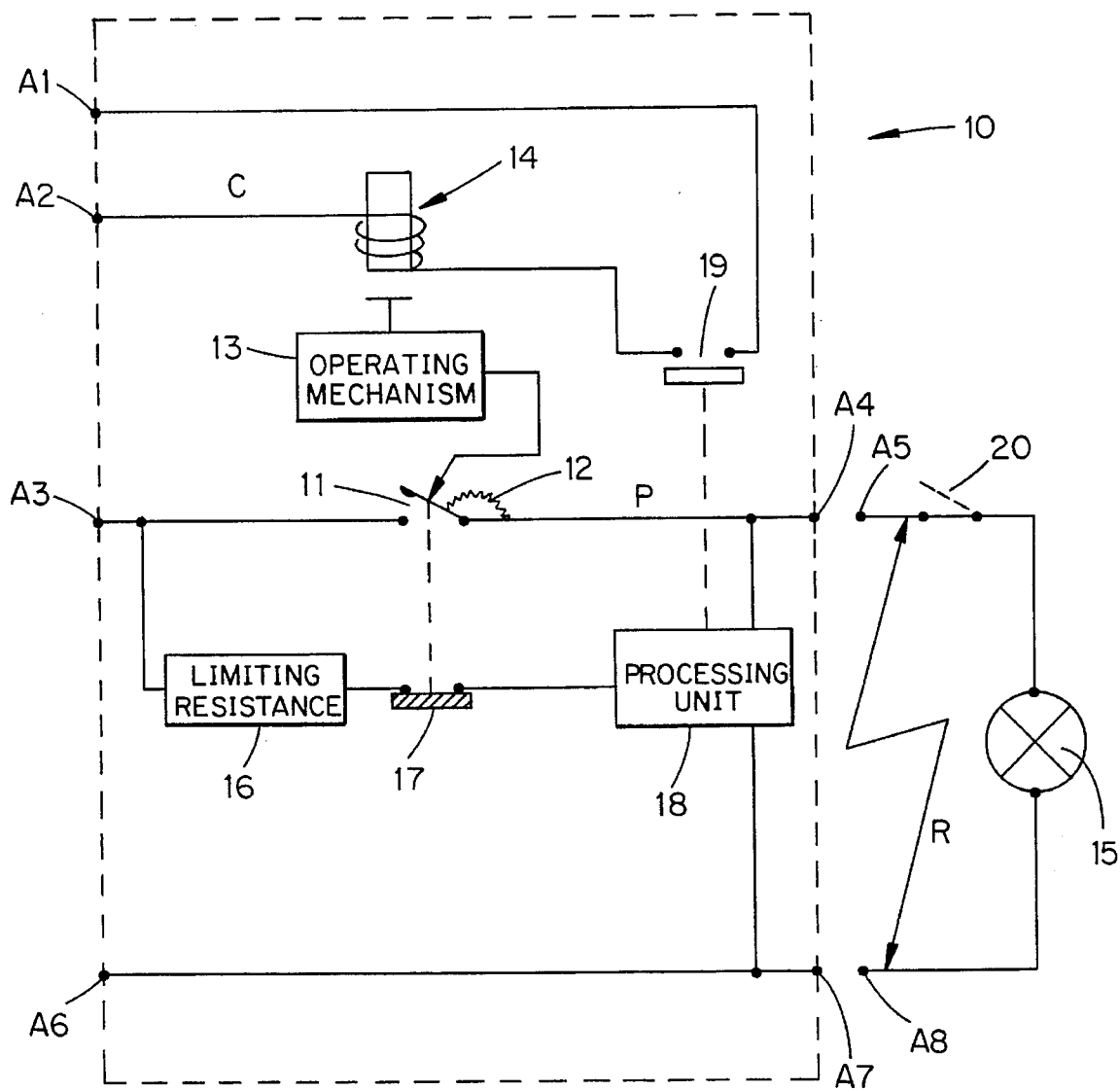
FIG. 1 represents a schematic view of the effector according to the invention.

FIG. 1 schematically represents the effector with contacts protected against welding in the event of a short-circuit. This effector 10 comprises power contacts 11 which are associated with a power spring 12 which is relatively weak but sufficient to maintain the contacts closed in the absence of repulsion forces by striction generated by a short-circuit. These power contacts are actuated by an operating mechanism 13 coupled to an operating electromagnet 14. The circuit in which the operating electromagnet 14 is mounted is called the control circuit C. This circuit can receive on its input terminals A1, A2 a control signal from outside, in the case where it is coupled to a remote control or comprises a pushbutton or any other manual control device (not represented).

The effector is designed to supply at least one receiver 15 actuated by switch 20 and being mounted in a circuit called the receiver circuit R. A power circuit designed to supply power to this receiver is defined by the terminals A3 and A4, between which the power contacts 11 are fitted. The terminal A3 is connected to the phase of the power system and the terminal A4 is connected to a power supply terminal A5 of the power supply circuit R of the receiver.

A return power circuit is defined by terminals A6 and A7, the terminal A6 being connected to the neutral of the power system and the terminal A7 to a terminal A8 of the power supply circuit R of the receiver.

In parallel with the power contacts 11 there is provided a circuit which comprises a limiting resistance 16, an injection circuit contact 17, and a measuring and processing unit 18, connected in series, and whose role will be defined hereinafter. The measuring and processing unit 18 is in addition connected to the return power circuit. Finally, this circuit is coupled to a contact 19 of the control circuit C.

The effector described above operates in the following manner. It is assumed that a short-circuit is pre-established in the power supply circuit R of the receiver and that a user attempts to trigger a closing control sequence. At rest, the power contacts 11 are open while contacts 17 are closed, and a voltage is injected via the limiting resistance 16, injection circuit contact 17, and measuring and processing unit 18 to the terminal A4, which enables this unit 18 to measure the impedance at the terminals A4–A7. So long as the power supply circuit R of the receiver is short-circuited, said measuring and processing unit 18 detects this and keeps the contact 19 of the control circuit C open. This control circuit is therefore inoperative. Thus the power circuit cannot be made to close when a short-circuit is pre-established, which has the consequence of maintaining the power contacts 11 to be open. Accordingly, the risks of contact bounce on closing, and subsequently the risks of welding, are eliminated.

When a closing sequence takes place on rated current, when the power supply circuit R of the receiver does not present a short-circuit fault, the measuring and processing unit 18 closes the contact 19 of the control circuit C which becomes operative. The power contacts 11 are closed by the operating mechanism 13 actuated by the electromagnet 14 which is excited. The power circuit is thereby closed on rated current.

When a short-circut occurs in the power supply circuit R of the receiver, the power contacts 11 tend to jump and weld. To avoid this phenomenon, they are equipped with a striction repulsion force compensation system which prevents them from load shedding and welding. This compensation system can be of two different types.

Figure 2:
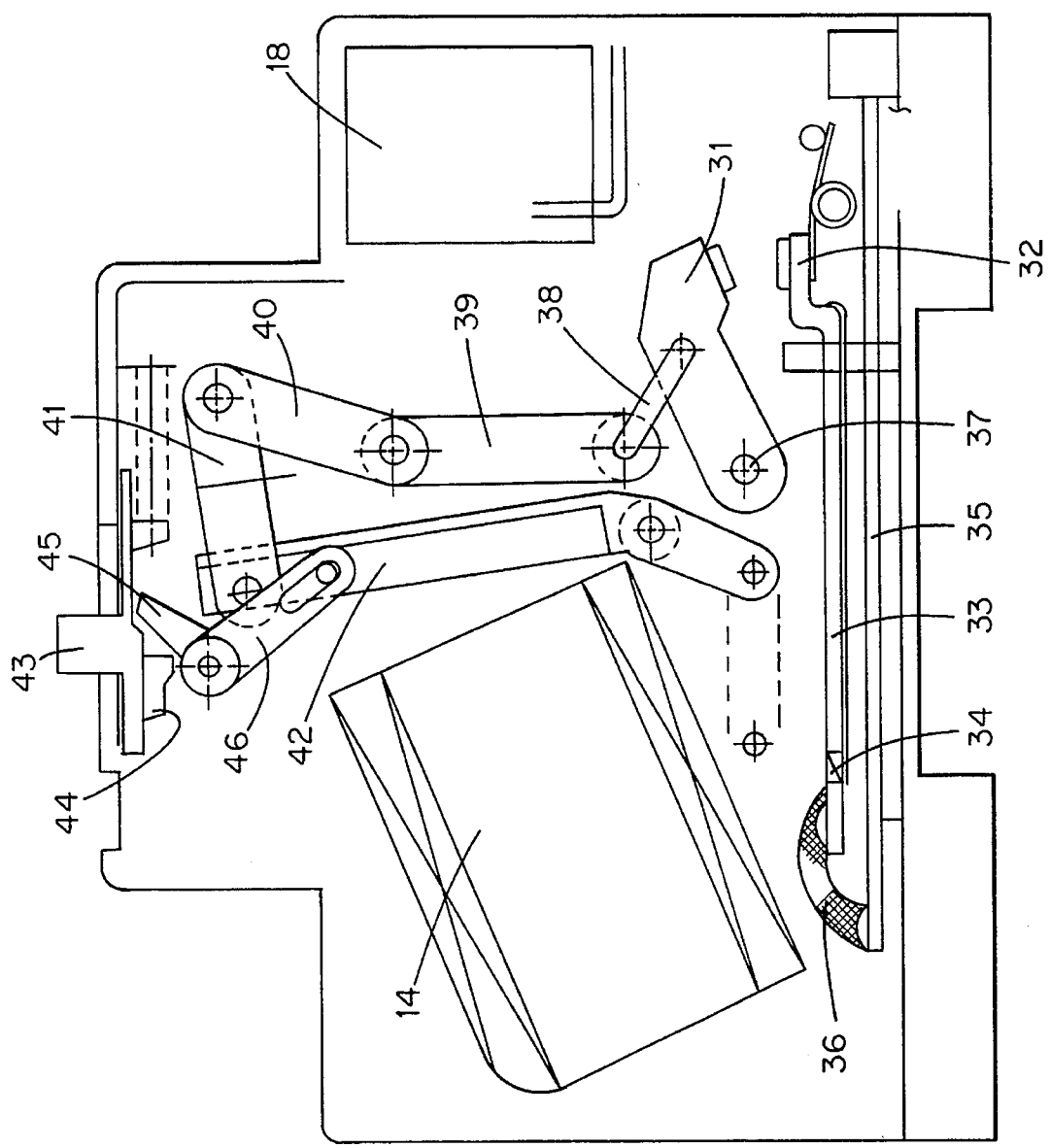
FIG. 2 represents an embodiment of a type of self-compensated contacts of the effector according to the invention.

One of these systems is of the electrodynamic type. An embodiment of this device is represented by FIG. 2. This device comprises two self-compensated contacts 31 and 32. These contacts 31 and 32 are the power contacts 11 of FIG. 1. The contact 32 is mounted at the end of a rod 33 articulated around a spindle 34. This rod is subjected to an electrodynamic force generated by the current flowing in a fixed rod 35, appreciably parallel to the rod 33, when the contacts 31 and 32 are closed. The two rods 33 and 35 are connected by a wire or flexible braided strip 36 which performs their electrical connection, such that current flows through rods 33 and 35 in opposite directions when the contacts 31 and 32 are closed. An electrodynamic force due to the current flowing through rods 33 and 35 has the effect of pressing the contacts 31 and 32 against one another thereby opposing striction repulsions.

Furthermore, the contact 31 is articulated on a spindle 37 and is mechanically coupled by a set of rods 38, 39, 40 and 41 to a movable blade 42 of the electromagnet 14 defined in the description of FIG. 1. Closing of the power contacts can also be achieved by means of a sliding control button 43 bearing a stop 44 arranged to cooperate with a handle 45 securely united to a pivoting actuating arm 46 coupled to the movable blade 42.

Figure 3:
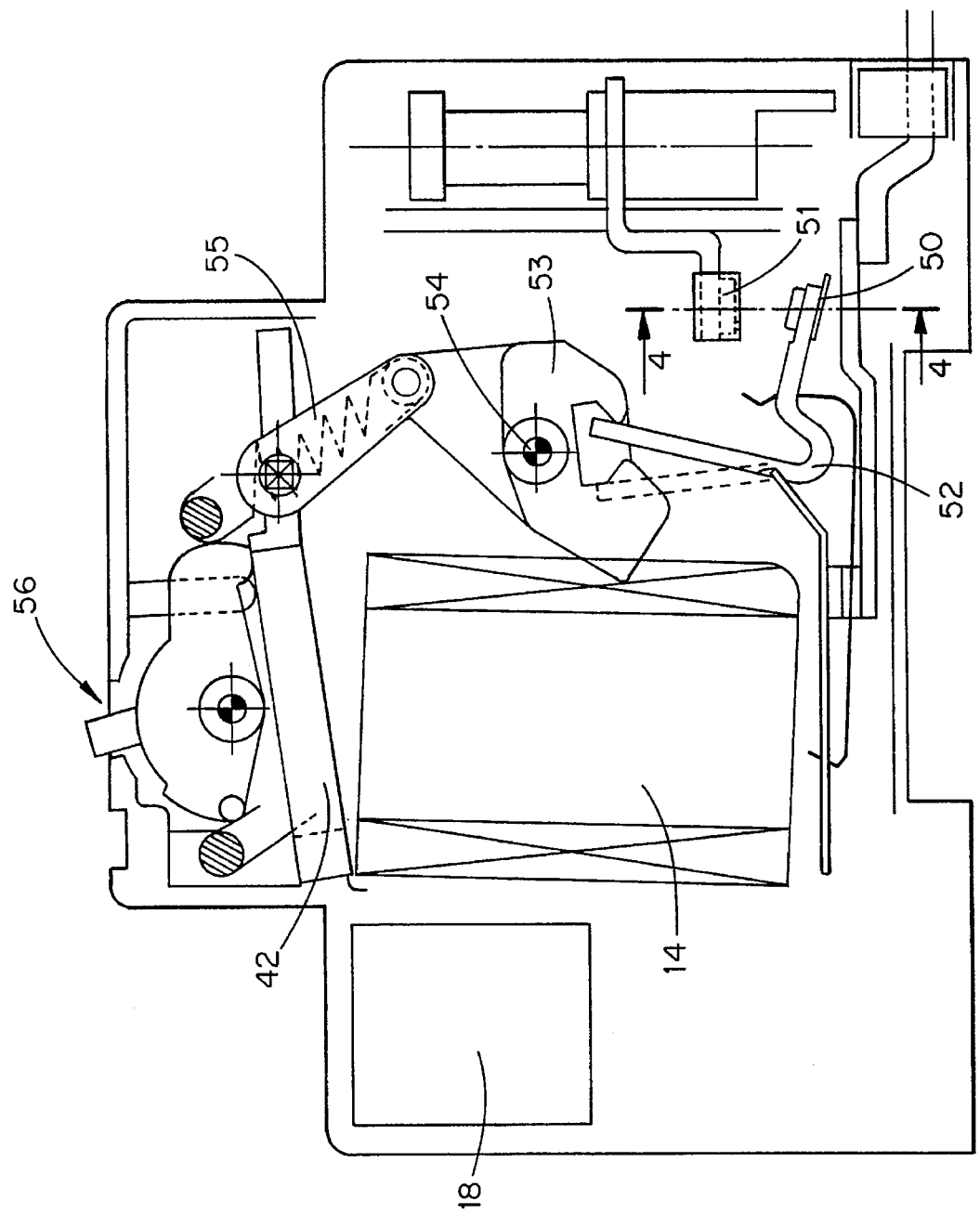
FIG. 3 represents another embodiment of a type of self-compensated contacts of the effector according to the invention.
Figure 4:
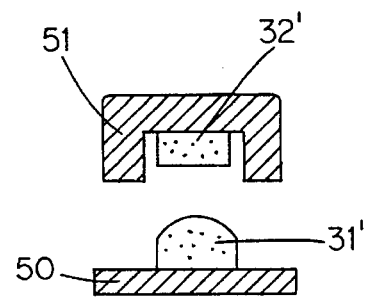
FIG. 4 represents a detailed view of the contacts of the effector represented by FIG. 3.

Another of these devices is of the electromagnetic type. An embodiment of this device is represented by FIG. 3. The contacts 31' and 32' corresponding to the self-compensated contacts 31 and 32 of the embodiment illustrated by FIG. 2 and constituting the power contacts 11 of FIG. 1, are equipped with a ferromagnetic circuit. Manufacture of this circuit is illustrated by FIG. 4. The movable contact 31' is associated with a blade 50 and the stationary contact 32' is associated with a bracket 51 which are arranged to cooperate and close the ferromagnetic circuit when the contacts are closed and have a fault current flowing through them. This electromagnetic attraction force opposes striction repulsions and prevents welding of the contacts.

The movable contact 31' is mounted at the end of a pivoting arm 52 able to occupy two stable positions determined by a rocker 53 pivoting around a fixed spindle 54 and mechanically coupled by a connecting rod 55 to the blade 42 of the electromagnet 14. A manual operating button 56 is provided to also actuate the blade 42.

In both cases, when the power circuit is closed and when a strong short-circuit current occurs, the self-compensated power contacts cannot load shed and are thus spared from risks of welding.

Figure 5:
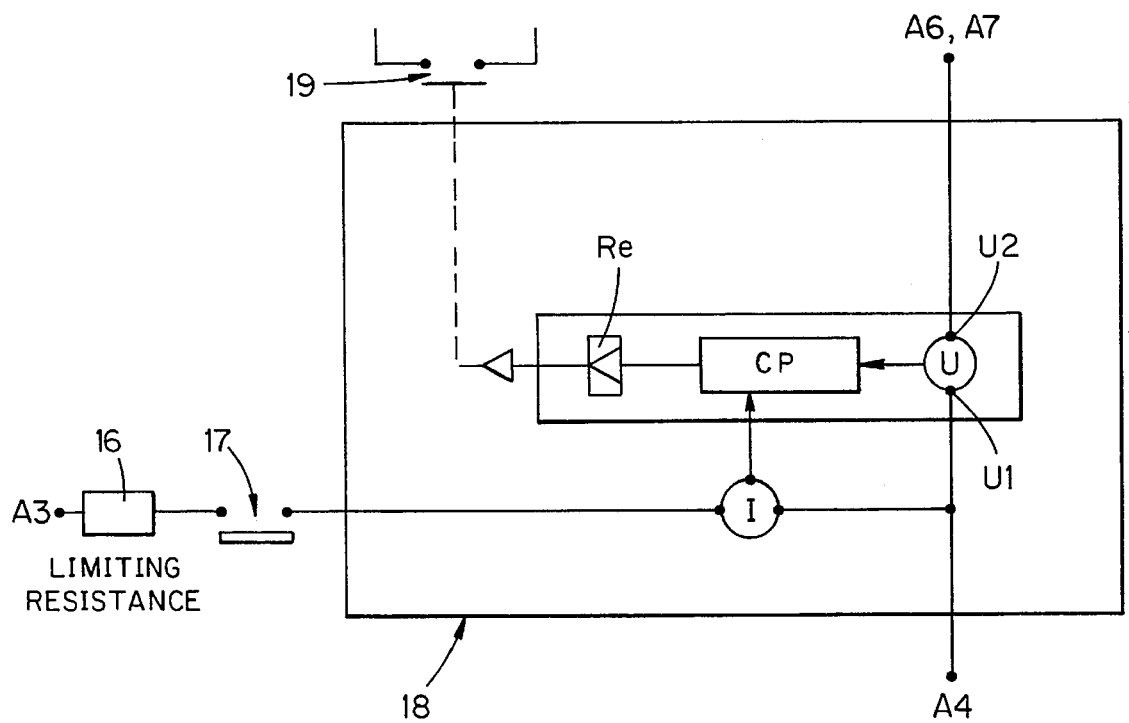
FIG. 5 represents a detailed view of the measuring and processing means of the effector according to the invention.

FIG. 5 represents the measuring and processing unit 18 in detail. This unit comprises a voltage sensor U whose terminals U1 and U2 are respectively connected to the power circuit between the terminals A3 and A4 and to the return power circuit between the terminals A6 and A7, a current sensor I mounted on a line connecting the injection circuit contact 17 to the terminal U2, a comparator CP which receives the signals sent by the two sensors and a relay Re. The comparator is designed to compare the impedance of the receiver's circuit with a preset reference which constitutes a threshold. Any impedance drop below this threshold causes actuation of the relay Re mechanically coupled to the contact 19 of the control circuit C, which results in opening of this circuit. Consequently, when the value of the receiver's circuit impedance is abnormal, closing of the power contacts is prevented.

We claim:

1. An electrical effector, comprising:
   a power supply circuit for supplying power to a receiver provided in a receiver circuit, said power supply circuit including power contacts;
   a control circuit including an operating mechanism and a switch provided in series with the operating mechanism, said operating mechanism including an electromagnet for operating the power contacts;
   compensation means for applying a compensating force to the power contacts when in the closed position to oppose striction repulsion forces acting on said power contacts due to a short-circuit in the receiver circuit; and
   prevention means for preventing closing of the power contacts from the open position under a short-circuit condition in the receiver circuit, said prevention means comprising (i) measuring means for measuring an impedance of the receiver circuit, said measuring means including a comparator to compare a measured impedance with a threshold impedance, (ii) a relay connected to said comparator and to said switch of the control circuit, said relay being actuated by a measured impedance which is below the threshold impedance to drive the switch and open the control circuit thereby preventing closing of the power contacts.

2. The effector of claim 1, wherein said measuring means further comprises a voltage sensor and a current sensor connected to the comparator.

3. The effector of claim 1, wherein said compensation means comprises an electrodynamic device.

4. The effector of claim 3, wherein said electrodynamic device comprises first and second substantially parallel rods electrically connected to each other such that current flows in opposite directions through the first and second rods when the power contacts are closed.

5. The effector of claim 4, wherein the first rod is fixed, and the second rod is articulated at a first end thereof, said second rod bearing one of the power contacts at a second end thereof, opposite said first end.

6. The effector of claim 1, wherein said compensation means comprises an electromagnetic device.

7. The effector of claim 6, wherein said electromagnetic device comprises a ferromagnet which is closed upon closing said power contacts.

8. The effector of claim 7, wherein said ferromagnet includes a blade and a bracket.

* * * * *